UNITED STATES PATENT OFFICE.

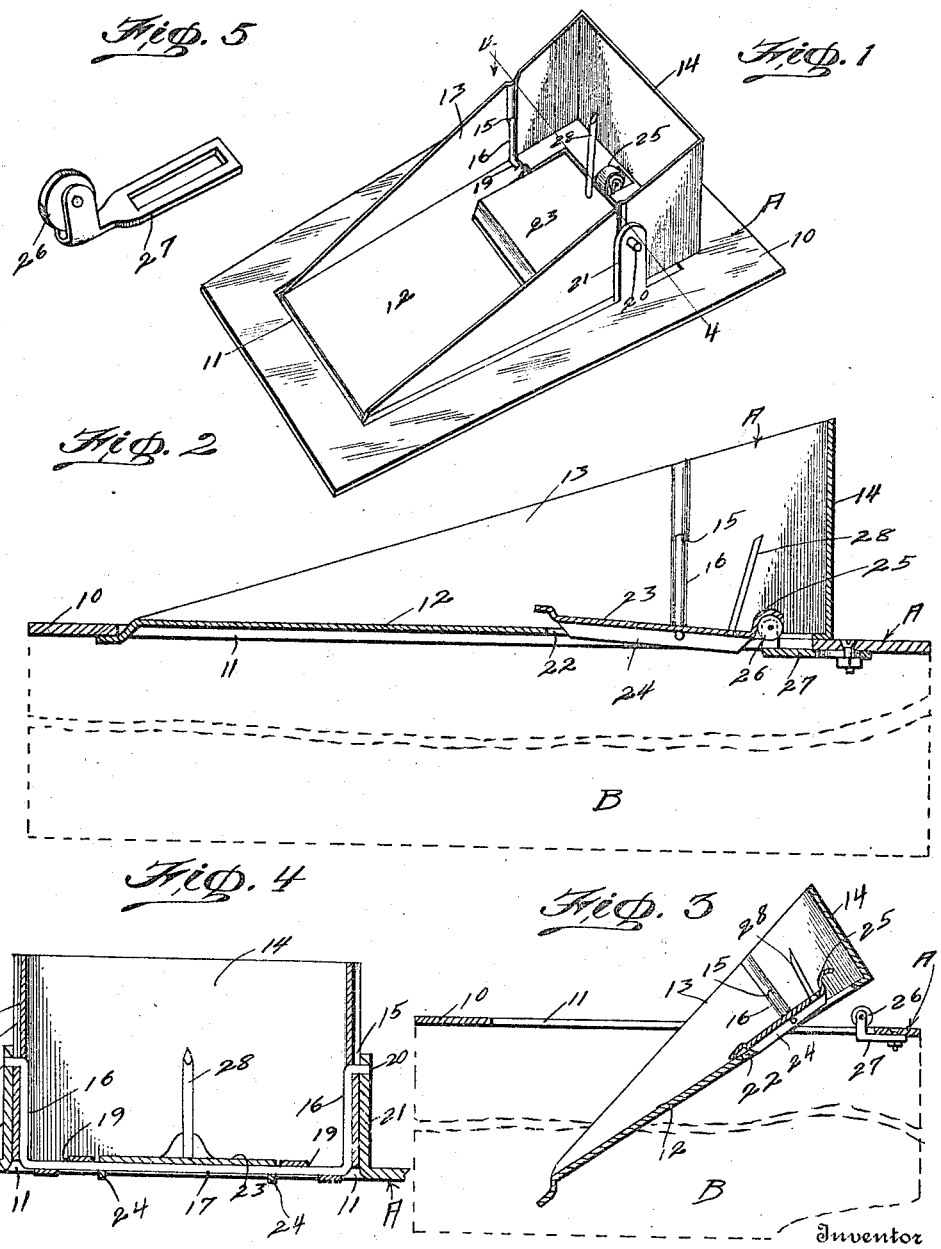

GEORGE W. HARGETT AND HARRY F. KIMBALL, OF HOISINGTON, KANSAS.

ANIMAL-TRAP.

1,277,575.

Specification of Letters Patent.

Patented Sept. 3, 1918.

Application filed January 7, 1918. Serial No. 210,644.

*To all whom it may concern:*

Be it known that we, GEORGE W. HARGETT and HARRY F. KIMBALL, citizens of the United States, residing at Hoisington, in the county of Barton, State of Kansas, have invented certain new and useful Improvements in Animal-Traps; and we do hereby declare the following to be a full, clear, and exact description of the invention, such as will enable others skilled in the art to which it appertains to make and use the same.

The invention relates to an animal trap, and more particularly to the class of rodent traps.

The primary object of the invention is the provision of a trap of this character, wherein an animal when trespassing thereon will overbalance the platform thereof to cause said animal to be precipitated within a receptacle which is adapted to contain water, thus in this manner drowning the animal.

Another object of the invention is the provision of a trap of this character wherein the bait holder is carried upon a pedal which normally latches the platform against tilting action, and when said animal steps upon the pedal it automatically releases the platform for the quick or instant trapping of such animal.

A further object of the invention is the provision of a trap of this character, which is extremely simple in construction, novel in form, adaptable for mounting upon a receptacle containing liquid for the drowning of the rodent when trapped, thoroughly reliable and efficient in its purpose, and operation, strong, durable and inexpensive to manufacture.

With these and other advantages in use, the invention consists in the features of construction, combination and arrangement of parts, as will be hereinafter fully described, illustrated in the accompanying drawing, and pointed out in the claims hereunto appended.

In the accompanying drawing:

Figure 1 is a perspective view of a trap constructed in accordance with the invention;

Fig. 2 is a vertical longitudinal sectional view thereof showing by dotted lines a receptacle supporting the same;

Fig. 3 is a view similar to Fig. 2 showing the platform tilted;

Fig. 4 is a transverse sectional view on the line 4—4 of Fig. 1;

Fig. 5 is a perspective view of the adjustable bracket with the friction roller.

Similar reference characters indicate corresponding parts throughout the several views in the drawing.

Referring to the drawing in detail, A designates generally a trap device, which comprises a base in the form of a plate 10, preferably made from sheet metal of the required rigidity, having a rectangular shaped opening 11 longitudinally thereof, and this plate is adapted to be placed upon a receptacle B which is filled to the desired level with water, the plate 10 being disposed over the upper open end of said receptacle, as shown in Fig. 2 of the drawing.

Arranged over the opening 11 in the plate 10 is a tilting platform 12 which is formed with opposite side walls 13 and an end wall 14 suitably joined with each other so that said platform is of substantially scoop shape with only one open end, thus constituting a pen for an animal with the entrance thereto at its open end.

The side walls 13 of the platform 12 are formed with holes 15 through which are passed the limbs 16 of a U-shaped pivot bail 17, the limbs 16 being seated in channels 18 struck from the side walls outwardly and inwardly therefrom beyond opposite sides of the holes 15, the bottom of the platform being also formed with holes 19 through which is passed the bail and in this manner the same is made fast to the platform. The bail straddles the platform 12 beneath its bottom to lie crosswise of the same. The limbs 16 are formed with outturned ends 20 journaled in the upper ends of vertical posts 21 formed on and rising from the plate 10 at opposite sides of the opening 11 therein. The pivot bail 17 is located intermediate the platform 12 to balance the same directly over the opening 11 in a substantially horizontal plane, which is the normal position of said platform with one end thereof resting against the underside of the plate 10 to limit the upward swinging of the platform.

The platform 12 is provided with an opening 22 having located therein a tread plate forming a pedal 23 with downwardly bent edges 24 serving as bearings for the pivot bail 17 and in this manner the pedal is supported for rocking movement in the opening 22 while one edge of said pedal is adapted to contact with the upper side of the platform to limit the downward swinging movement of said pedal when an animal treads thereon and the opposite or innermost edge of the pedal 23 is formed with a keeper lip 25 with which engages a frictional roller 26 journaled in a bracket 27 adjustably secured to the plate 10, the bracket being extended upwardly through suitable notches in one edge of the openings in the plate 10 and platform 12 and this upwardly extending portion forms a furcation for the roller, the lip 25 being curved over the roller 26 to cover the same to avoid the animal standing thereon.

The tread pedal 23 when frictionally engaged with the roller 26 latches the platform in balanced position and when an animal treads upon said pedal 23 it is rocked a limited distance for the release of the platform 12 which becomes overbalanced by the weight of the animal thereon and on tilting of the same said animal drops therefrom or is precipitated through the opening 11 in the plate 10 into the receptacle B whence the animal will drown in the water therein.

On the pedal 23 is a bait holder in the form of a pin 28 for the engagement of bait therewith which is used for enticing the animal onto the pedal for the automatic tilting action of the platform to trap the animal in the receptacle.

It is of course to be understood that changes, variations and modifications may be made such as come properly within the scope of the appended claims without departing from the spirit of the invention or sacrificing any of its advantages. From the foregoing it is believed that the construction and manner of operation of the trap will be clearly understood and therefore a more extended explanation has been omitted.

What is claimed is:

1. In a trap, a base having an opening, a tilting platform pivotally supported over the opening, a pedal pivoted on the platform, means on the base and engaged with the pedal to latch the platform in normal position, a bait holder on the pedal and a guard on the pedal and bridging the means on the base for the latching of said pedal.

2. In a trap, a base having an opening, a tilting platform pivotally supported over the opening, a pedal pivoted on the platform, means on the base and engaged with the pedal to latch the platform in normal position, a bait holder on the pedal and a guard on the pedal and bridging the means on the base for the latching of said pedal, and means for limiting the swinging movements of the platform and pedal.

3. In a trap, a base having an opening, a substantially scoop shaped platform over said opening, a bail pivot supporting the platform in normal balanced position, posts on the base for said pivot, a tread pedal swinging support on the pivot, a bracket on the base and having friction means engaging the pedal to normally hold the platform in balanced position, and a bait holder on the pedal.

4. In a trap, a base having an opening, a substantially scoop shaped platform over said opening, a bail pivot supporting the platform in normal balanced position, posts on the base for said pivot, a tread pedal swinging support on the pivot, a bracket on the base and having friction means engaging the pedal to normally hold the platform in balanced position, a bait holder on the pedal and a lip on said pedal and extending over the friction means.

In testimony whereof we affix our signatures in the presence of two witnesses.

GEORGE W. HARGETT.
HARRY F. KIMBALL.

Witnesses:
C. L. MUNN,
C. A. ELMORE.

Copies of this patent may be obtained for five cents each, by addressing the "Commissioner of Patents, Washington, D. C."